United States Patent
Miller et al.

(10) Patent No.: US 10,246,094 B2
(45) Date of Patent: Apr. 2, 2019

(54) AUTONOMOUS VEHICLE CORNERING MANEUVER

(71) Applicant: Ford Global Technologies, LLC, Dearborn, MI (US)

(72) Inventors: Kenneth James Miller, Canton, MI (US); Thomas G. Leone, Ypsilanti, MI (US); William Paul Perkins, Dearborn, MI (US); Douglas Raymond Martin, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 200 days.

(21) Appl. No.: 14/564,567

(22) Filed: Dec. 9, 2014

(65) Prior Publication Data
US 2016/0159360 A1    Jun. 9, 2016

(51) Int. Cl.
  *B60W 40/10* (2012.01)
  *B60W 30/18* (2012.01)
  (Continued)

(52) U.S. Cl.
  CPC ...... *B60W 30/18127* (2013.01); *B60W 20/12* (2016.01); *B60W 30/188* (2013.01);
  (Continued)

(58) Field of Classification Search
  CPC .......... B60W 30/188; B60W 30/1882; B60W 30/18009; B60W 50/0098; B60W 20/12; B60W 20/13
  (Continued)

(56) References Cited

U.S. PATENT DOCUMENTS

| | | | | |
|---|---|---|---|---|
| 6,752,225 B2* | 6/2004 | Kojima | ..... | B60K 6/48 180/65.25 |
| 7,160,225 B2* | 1/2007 | Berger | ..... | B60K 6/48 477/167 |

(Continued)

FOREIGN PATENT DOCUMENTS

| | | |
|---|---|---|
| BG | 1831 U1 | 1/2014 |
| CN | 104125902 A | 10/2014 |
| DE | 102011006741 A1 | 10/2012 |

OTHER PUBLICATIONS

Efficiency improved sensorless control scheme for electric vehicle induction motors; Farasat, M.; Trzynadlowski, A.M.; Fadali, M.S. Electrical Systems in Transportation, IET; Year: 2014, vol. 4, Issue: 4; pp. 122-131, DOI: 10.1049/iet-est.2014.0018.*

(Continued)

*Primary Examiner* — Cuong H Nguyen
(74) *Attorney, Agent, or Firm* — Frank A. MacKenzie; Bejin Bieneman PLC

(57) ABSTRACT

An example vehicle system includes a sensor and a processing device. The sensor is configured to identify a first location and a second location. The processing device is programmed to estimate a plurality of energy usages. Each energy usage is based at least in part on a speed of a host vehicle at the first location. The processing device is further programmed to select one of the plurality of energy usages as a target useable energy and control the host vehicle in accordance with the speed associated with the target useable energy.

20 Claims, 3 Drawing Sheets

(51) Int. Cl.
*B60W 50/00* (2006.01)
*B60W 30/188* (2012.01)
*B60W 20/12* (2016.01)

(52) U.S. Cl.
CPC ...... *B60W 30/18145* (2013.01); *B60W 40/10* (2013.01); *B60W 50/0098* (2013.01); *B60W 2420/90* (2013.01); *B60W 2510/18* (2013.01); *B60W 2510/20* (2013.01); *B60W 2510/244* (2013.01); *B60W 2550/146* (2013.01); *B60W 2550/402* (2013.01); *B60W 2720/10* (2013.01); *Y10S 903/903* (2013.01)

(58) Field of Classification Search
USPC ........... 701/123, 22, 70, 408, 532; 180/65.1, 180/65.21, 65.285, 65.29; 903/903
See application file for complete search history.

(56) References Cited

U.S. PATENT DOCUMENTS

| | | | | |
|---|---|---|---|---|
| 7,809,491 | B1* | 10/2010 | Bevan | F02D 41/0032 123/480 |
| 8,452,505 | B2* | 5/2013 | Mizuno | B60K 35/00 180/65.1 |
| 8,706,409 | B2* | 4/2014 | Mason | G01C 21/3469 701/411 |
| 8,744,656 | B2* | 6/2014 | Sato | B60L 7/14 701/22 |
| 9,114,806 | B2* | 8/2015 | Wang | B60W 10/06 |
| 9,118,201 | B2* | 8/2015 | Kumar | H02J 7/007 |
| 9,168,843 | B2* | 10/2015 | Choi | B60L 11/1861 |
| 9,283,954 | B2* | 3/2016 | Dalum | B60W 20/12 |
| 9,533,596 | B2* | 1/2017 | Martin | B60L 11/1861 |
| 9,701,302 | B2* | 7/2017 | Matsunaga | G01C 21/3469 |
| 9,733,625 | B2* | 8/2017 | Kumar | B61L 3/006 |
| 9,764,634 | B2* | 9/2017 | Dorsett | B60W 20/10 |
| 2002/0063000 | A1* | 5/2002 | Kojima | B60K 6/48 180/65.1 |
| 2005/0039630 | A1* | 2/2005 | Kumar | B60K 6/46 105/35 |
| 2005/0090370 | A1* | 4/2005 | Berger | B60K 6/48 477/167 |
| 2007/0142985 | A1* | 6/2007 | Kumar | B60L 11/1801 701/22 |
| 2007/0150157 | A1 | 6/2007 | Lee et al. | |
| 2008/0300766 | A1 | 12/2008 | Kumabe et al. | |
| 2010/0088011 | A1* | 4/2010 | Bruce | G01C 21/20 701/532 |
| 2011/0320074 | A1* | 12/2011 | Erlston | B60K 6/26 701/22 |
| 2012/0123624 | A1* | 5/2012 | Sato | B60L 7/14 701/22 |
| 2012/0196713 | A1* | 8/2012 | He | B60K 6/105 475/5 |
| 2012/0196721 | A1* | 8/2012 | He | B60K 6/105 477/3 |
| 2012/0197472 | A1* | 8/2012 | He | B60K 6/105 701/22 |
| 2012/0316717 | A1* | 12/2012 | Daum | B60L 11/1842 701/22 |
| 2012/0326856 | A1 | 12/2012 | Levin et al. | |
| 2012/0330505 | A1* | 12/2012 | Tsumori | B60W 10/06 701/36 |
| 2013/0179007 | A1* | 7/2013 | Dalum | B60W 20/108 701/2 |
| 2014/0297116 | A1* | 10/2014 | Anderson | H02K 5/12 701/37 |
| 2015/0197162 | A1* | 7/2015 | Martin | B60L 11/1861 701/22 |
| 2015/0224845 | A1* | 8/2015 | Anderson | B60G 17/019 701/37 |
| 2016/0159360 | A1* | 6/2016 | Miller | B60W 50/0098 701/22 |
| 2017/0321616 | A1* | 11/2017 | Miller | F02D 19/0615 |

OTHER PUBLICATIONS

Route Preview in Energy Management of Plug-in Hybrid Vehicles ; Chen Zhang; Vahidi, A.; Control Systems Technology, IEEE Transactions on; Year: 2012, vol. 20, Issue: 2; pp. 546-553, DOI: 10.1109/TCST.2011.2115242.*

Ageing Estimation of Lithium-Ion Batteries Applied to a Three-Wheel PHEV Roadster; Nadeau, J.; Dubois, M.R.; Desrochers, A.; Denis, N.; Vehicle Power and Propulsion Conference (VPPC), 2013 IEEE; Year: 2013; pp. 1-6, DOI: 10.1109/VPPC.2013.6671663.*

Charge-Depleting Control Strategies and Fuel Optimization of Blended-Mode Plug-In Hybrid Electric Vehicles; Bingzhan Zhang; Mi, C.C.; Mengyang Zhang; Vehicular Technology, IEEE Transactions on; Year: 2011, vol. 60, Issue: 4; pp. 1516-1525, DOI: 10.1109/TVT.2011.2122313.*

Emission inventory assessment for a container vessel; Fangfang Wang; Han P. Bao; Thomas Kiernan; 2009 IEEE International Symposium on Sustainable Systems and Technology; Year: 2009; pp. 1-6, DOI: 10.1109/ISSST.2009.5156740.*

IT Infrastructure for Providing Energy-as-a-Service to Electric Vehicles; Smruti R. Sarangi; Partha Dutta; Komal Jalan; IEEE Transactions on Smart Grid; Year: 2012, vol. 3, Issue: 2; pp. 594-604, DOI: 10.1109/TSG.2011.2175953.*

Power management and economic estimation of fuel cell hybrid vehicle using fuzzy logic; Xiangjun Li; Jianqiu Li; Liangfei Xu; Minggao Ouyang; 2009 IEEE Vehicle Power and Propulsion Conference; Year: 2009; pp. 1749-1754, DOI: 10.1109/VPPC.2009.5289696.*

Simulation model for a serial hybrid bus and impact of energy management on fuel consumption; Stefan Dewenter; A. Binder; Mirco Strauch; 2012 IEEE Vehicle Power and Propulsion Conference; Year: 2012; pp. 863-868, DOI: 10.1109/VPPC.2012.6422726.*

Electrical propulsion system design of Chevrolet Bolt battery electric vehicle; Faizul Momen; Khwaja Rahman; Yochan Son; Peter Savagian; 2016 IEEE Energy Conversion Congress and Exposition (ECCE); Year: 2016; pp. 1-8, DOI: 10.1109/ECCE.2016.7855076.*

Adaptive regenerative braking control in severe cornering for guaranteeing the vehicle stability of fuel cell hybrid electric vehicle Jihun Han; Youngjin Park; Youn-sik Park; 2011 IEEE Vehicle Power and Propulsion Conference; Year: 2011 pp. 1-5, DOI: 10.1109/VPPC.2011.6043014.*

Research on the Cooperative Train Control Strategy to Reduce Energy Consumption; Jianqiang Liu; Huailong Guo; Yingxue Yu; IEEE Transactions on Intelligent Transportation Systems; vol. 18; Issue:5; pp. 1134-1142, IEEE Journals & Magazines. (Year: 2017).*

Prediction-Based Eco-Approach and Departure at Signalized Intersections With Speed Forecasting on Preceding Vehicles; Fei Ye; Peng Hao; Xuewei Qi; Guoyuan Wu; Kanok Boriboonsomsin; Matthew J. Barth; IEEE Transactions on Intelligent Transportation System; pp. 1-12, year 2018.*

CN Notification of First Office Action dated Jan. 24, 2019 re Appl. No. 201510822577.5.

* cited by examiner

AUTONOMOUS VEHICLE CORNERING MANEUVER

BACKGROUND

Some vehicles can increase fuel efficiency by using energy recovery strategies. One such strategy includes regenerative braking. Regenerative braking includes converting kinetic energy into electrical energy. The captured electrical energy can be temporarily stored in a battery or fuel cell and used to propel a vehicle.

DETAILED DESCRIPTION

The energy lost during a cornering maneuver due to additional cornering frictional forces, may affect fuel economy. Typically, a vehicle slows down before a curve or turn in the road. The vehicle negotiates the curve at a slower speed and accelerates as the vehicle exits the curve. In addition to the losses during cornering, slowing down and re-accelerating to cruising speed, also increases energy loss, resulting in decreased fuel efficiency. One way to reduce the energy loss is to autonomously control the vehicle to operate at optimized speeds going into and coming out of the turn. This can be accomplished by incorporating a vehicle system that has a sensor and a processing device into a host vehicle. The sensor identifies a first location and possibly a second location. The first location may represent the beginning of the curve and the second location may represent the end of the curve. The processing device is programmed to estimate a plurality of energy usages. Each energy usage is based, at least in part, on a speed of the host vehicle at the first location. The processing device is further programmed to select one of the plurality of energy usages as a target useable energy and control the host vehicle in accordance with the speed associated with the target useable energy. Alternatively, in the case where the host vehicle is not autonomously nor semi-autonomously operated, the vehicle system may alert the driver of the best speeds for optimizing energy usage.

The elements shown may take many different forms and include multiple and/or alternate components and facilities. The example components illustrated are not intended to be limiting. Indeed, additional or alternative components and/or implementations may be used.

Figure 1:
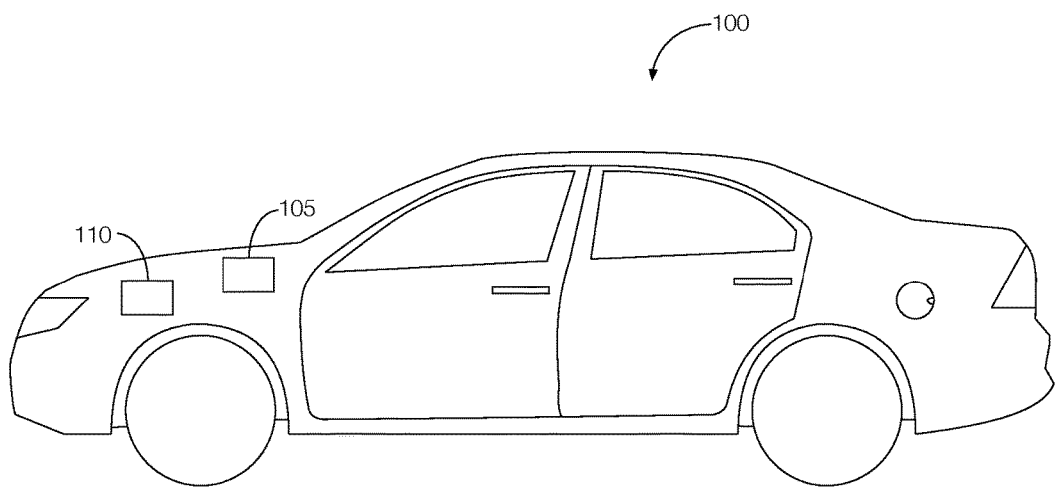
FIG. 1 illustrates an example vehicle with a system for performing cornering maneuvers with increased efficiency.

As illustrated in FIG. 1, a host vehicle 100 includes a system 105 that controls the host vehicle 100 during cornering maneuvers to increase the efficiency of energy usage. As discussed in greater detail below, the system 105 can identify the beginning and end of a curve in a road. The beginning of the curve may be referred to as a first location and the end of the curve may be referred to as a second location. The system 105 may identify the first and second locations, estimate a radius of the curve between the first and second locations, estimate the energy usage for multiple speeds when negotiating the curve, and selecting the speed with the most efficient energy usage as the target useable energy. If the second location and radius of curve cannot be initially identified, the system 105 may use other methods for estimation, such as use standard radius turns or available mapping information of the turn. The system 105 may control the host vehicle 100 in accordance with the target useable energy. For instance, the system 105 may output a command signal to cause the host vehicle 100 to slow to a particular speed associated with the most efficiency energy usage by the time the host vehicle 100 reaches the first location.

Although illustrated as a sedan, the host vehicle 100 may include any passenger or commercial automobile such as a car, a truck, a sport utility vehicle, a crossover vehicle, a van, a minivan, a taxi, a bus, bike, etc. In some possible approaches, the host vehicle 100 is an autonomous vehicle configured to operate in an autonomous (e.g., driverless) mode, a partially autonomous mode, and/or a non-autonomous mode. The host vehicle 100 may further include a hybrid or electric vehicle with an on-board power source 110 such as a battery or fuel cell. The power source 110 may be configured to store electrical energy and output electrical energy to certain components of the vehicle drive train, including an electric motor configured to propel the host vehicle 100.

Figure 2:
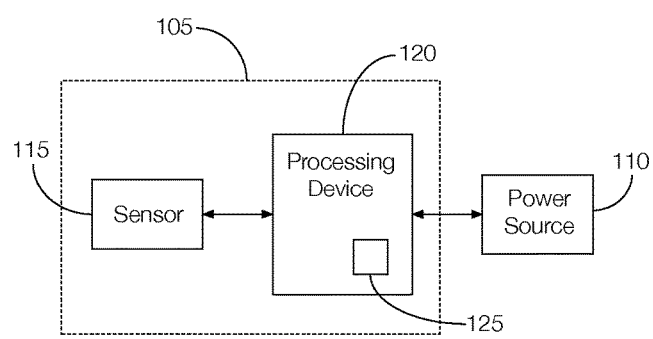
FIG. 2 is a block diagram of example components of the system incorporated into the vehicle of FIG. 1.

FIG. 2 is a block diagram of example components of the system 105 incorporated into the host vehicle 100. As shown, the system 105 includes a sensor 115 and a processing device 120.

The sensor 115 may include any number of computing devices configured to identify the first location and the second location. The sensor 115 may be programmed to identify the first and second locations from, e.g., the location of the host vehicle 100 and a navigational map. Therefore, the sensor 115 may include or be in communication with a vehicle navigation system. Alternatively, the sensor 115 may be configured to identify the first and second locations by observing features of the road. Thus, the sensor 115 may include radar, lidar, a visual (i.e., camera) sensor, an ultrasonic sensor, etc.

The processing device 120 may include any number of computing devices programmed to optimize operation of the host vehicle 100, in terms of energy usage, relative to a particular upcoming curve along the route of the host vehicle 100. The processing device 120 may be programmed to estimate or calculate the radius of the curve between the first and second locations. The radius may be calculated or estimated from, e.g., geographic coordinates. Alternatively, the radius may be stored in a database, and the processing device 120 may be programmed to query the database for the appropriate radius.

The processing device 120 may be further programmed to estimate the energy usage of the host vehicle 100 based on the speed of the host vehicle 100 at the time the host vehicle 100 reaches the first location. The processing device 120 may be programmed to determine the energy usages at a number of different speeds. For instance, the processing device 120 may determine the energy usages at, e.g., 10 speeds. The processing device 120 may include a counter 125 to count the number of energy usages evaluated.

A first energy usage may be based on the speed of the host vehicle 100 when the host vehicle 100 reaches the first location. Therefore, the first energy usage may be function of the current speed of the host vehicle 100 (i.e., at the time the processing device 120 estimates the energy usage) and one of the possible speeds of the host vehicle 100 at the first location. The processing device 120 may be further programmed to estimate a second energy usage—that is, the amount of energy the host vehicle 100 will have when reaching the second location (i.e., coming out of the curve). The total energy usage may be considered the sum of the first and second energy usages calculated or estimated. In some instances, the processing device 120 may further incorporate a third energy usage—the amount of energy required for the host vehicle 100 to accelerate away from the second location—when estimating or calculating the total energy usage.

The processing device 120 may be further programmed to estimate certain losses for one or more of the energy usages. Losses may include a present regeneration loss and a future regeneration loss. The present regeneration loss may refer to energy losses associated with slowing the host vehicle 100 prior to reaching the first location. Therefore, present regeneration losses may include energy losses associated with capturing energy during, e.g., a regenerative braking procedure and storing the captured energy in the power source 110. Future regeneration loss may refer to energy losses associated with accelerating the host vehicle 100 after reaching the second location. For example, future regeneration losses may include energy losses associated with drawing power from the power source 110. Present and future regeneration losses may further include other types of losses including, e.g., friction or mechanical energy losses.

As mentioned above, the processing device 120 may be programmed to determine the total energy usage for a number of different speeds. The processing device 120 may be programmed to select the highest remaining total energy to deliver the most efficient total energy usage as the target useable energy. With the target useable energy selected, the processing device 120 may be programmed to output a control signal commanding the host vehicle 100 to slow to the speed associated with the target useable energy.

Figure 3:
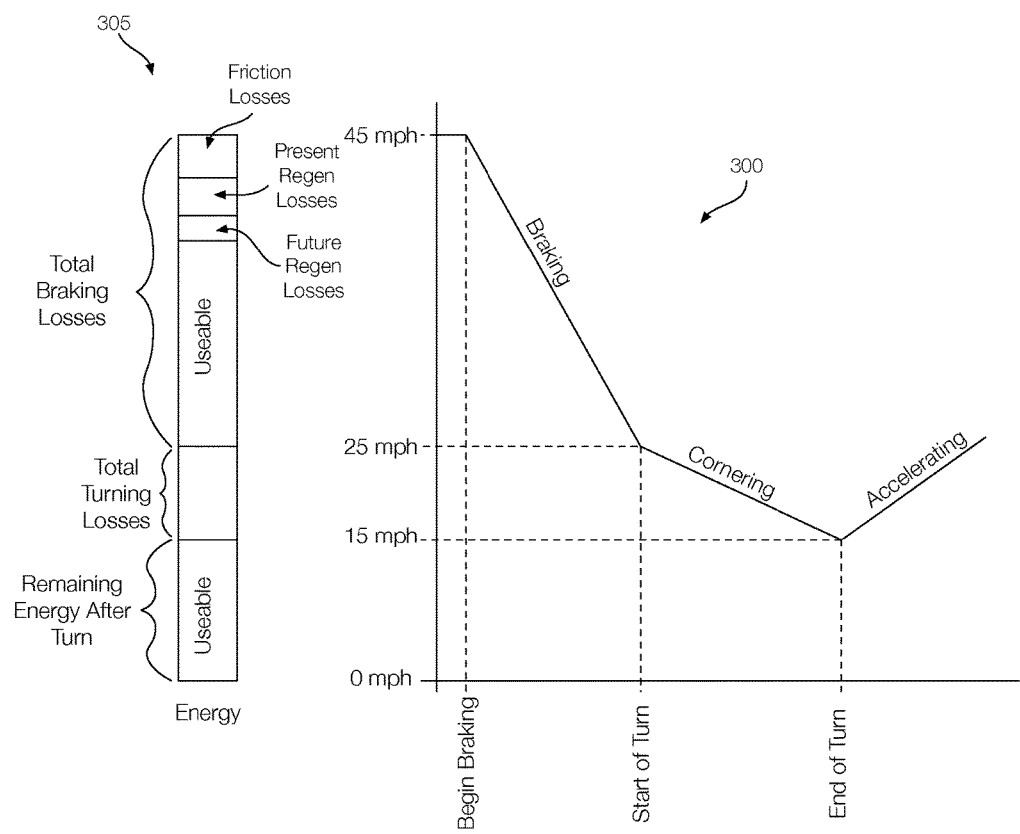
FIG. 3 is a graph relating energy usage of the vehicle at different times before, during, and after performing a cornering maneuver.

FIG. 3 is a graph 300 relating energy usage of the vehicle at different times before, during, and after performing a cornering maneuver. As shown, the x-axis represents time and the y-axis represents energy usage. The total amount of usable energy (e.g., kinetic energy and recovered energy stored in the battery) is shown in the bar 305 adjacent to the graph 300.

Well before reaching the first location ("Start of Turn" in FIG. 3), the kinetic energy of the host vehicle 100 is relatively high. As discussed above, the system 105 determines the optimum energy usage for the host vehicle 100 when executing the cornering maneuver. The system 105 may estimate the total energy usage for the cornering maneuver based on a number of different speeds of the host vehicle 100 at the time the host vehicle 100 reaches the first location. The graph 300 shows one example situation where the host vehicle 100 is travelling at 45 mph and the target useable energy, expressed as speed, includes braking the host vehicle 100 to 25 mph so that the host vehicle 100 is travelling that speed when the host vehicle 100 reaches the first location (i.e., the beginning of the curve). Some usable energy is captured while braking through, e.g., a regenerative braking process, and the system 105 considers the amount of usable energy captured during braking, along with the present and future regeneration losses, when estimating the total usable energy at each speed.

The host vehicle 100 may lose kinetic energy between the first and second locations. For instance, the host vehicle 100 may not accelerate or brake while negotiating the curve. Therefore, energy may be lost between the first and second locations due to friction and other mechanical energy losses.

The host vehicle 100 may begin to accelerate at the second location ("End of Turn" in FIG. 3). Although usable energy may be consumed while the host vehicle 100 is accelerating, the amount of kinetic energy at the time the host vehicle 100 begins to accelerate may be considered usable energy that contributes to the total usable energy estimated by the system 105 prior to reaching the first location. As shown in the bar 305, the speed of the host vehicle 100 at the time the host vehicle 100 accelerates away from the second location may be considered usable energy.

Figure 4:
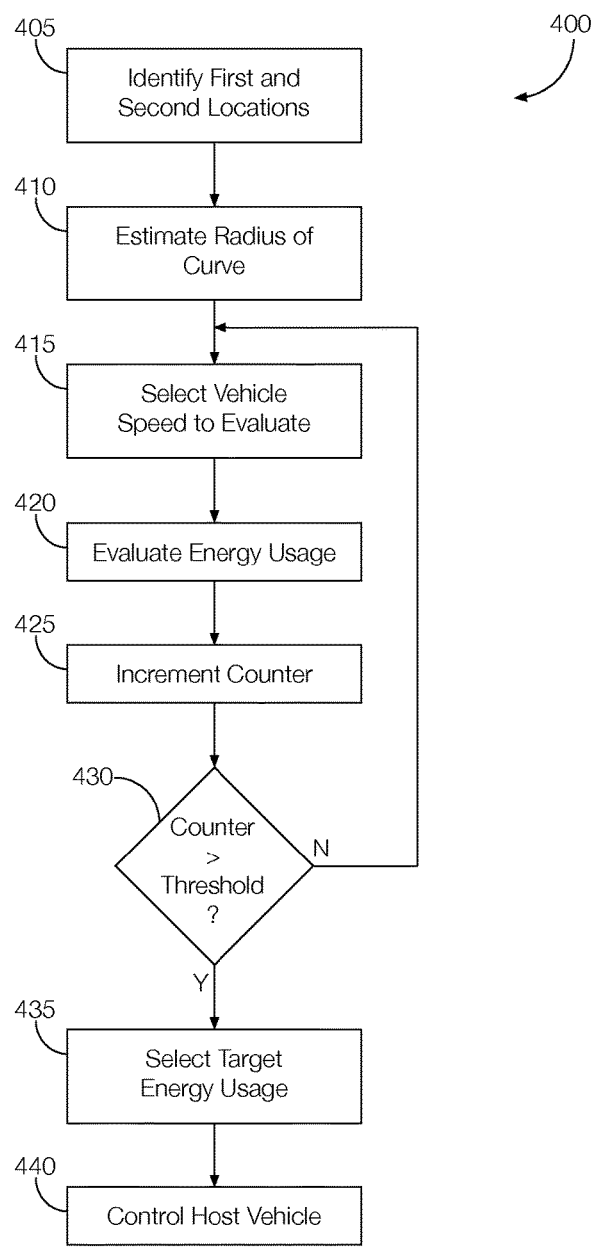
FIG. 4 is a flowchart of an example process that may be executed by the system of FIG. 2.

FIG. 4 is a flowchart of an example process 400 that may be implemented by one or more components of the system 105 to control the host vehicle 100 during a cornering maneuver to optimize energy usage. The process 400 may be initiated when the host vehicle 100 is turned on and operating in an autonomous or partially autonomous mode.

At block 405, the sensor 115 may identify the first location and the second location. The first and second locations may be identified from, e.g., the location of the host vehicle 100 and a navigational map. Alternatively, the sensor 115 may be configured to identify the first and second locations by observing features of the road. As discussed above, the first location may represent the beginning of a curve in the path of the host vehicle 100 and the second location may represent the end of the curve.

At block 410, the processing device 120 may estimate a radius of the curve between the first and second locations. The radius may be calculated or estimated from, e.g., geographic coordinates. Alternatively, the radius may be stored in a database, and the processing device 120 may query the database for the appropriate radius.

At block 415, the processing device 120 may select a possible vehicle speed for evaluation. The possible speed selected may be based on a possible or likely speed of the host vehicle 100 at the time the host vehicle 100 reaches the first location. The first vehicle speed evaluated may be, e.g., the fastest possible or likely speed, the slowest possible or likely speed, or any speed in between.

At block 420, the processing device 120 may evaluate the energy usage of the host vehicle 100 at the speed selected at block 415. Evaluating the energy usage may include estimating a first energy usage associated with the host vehicle 100 reaching the first location from its present location. For instance, the processing device 120 may consider the present speed of the host vehicle 100 and the speed selected at block 415 to determine the first energy usage. Estimating the energy usage may further include estimating a second energy usage associated with the host vehicle 100 reaching the second location. The second energy usage may be based on a difference of the speed of the host vehicle 100 at the first location, selected at block 415, and the likely speed of the host vehicle 100 at the second location. The speed of the host vehicle 100 at the second location may be a function of the speed of the speed selected at block 415. In some instances, the processing device 120 may further estimate a third energy usage. The third energy usage may be associated with the host vehicle 100 accelerating from the second location. Therefore, the third energy usage may be a function of the speed of the host vehicle 100 at the second location and a target speed, such as the speed limit or speed of the host vehicle 100 prior to braking before the first location (e.g., the speed of the host vehicle 100 when the first location or second location are first identified).

Estimating the energy usages may further include accounting for various energy losses. Such losses may include a present regeneration loss associated with slowing the host vehicle 100 prior to reaching the first location and storing energy recovered during a regeneration process into the power source 110. Another type of loss may include a future regeneration loss associated with drawing stored energy from the power source 110 and accelerating the host vehicle 100 away from the second location.

At block 425, the processing device 120 may increment a counter 125. The processing device 120 may be programmed to increment the counter 125 each time an energy usage associated with a particular speed is evaluated. The counter 125 may output a count indicating the number of times the counter 125 has been incremented since it was last reset.

At decision block 430, the processing device 120 may compare the count output by the counter 125 to a predetermined threshold. The threshold may be based on the total number of speeds to select. For instance, if the processing device 120 is programmed to select, e.g., 10 speeds at block 415, and thus evaluate 10 energy usages, the threshold may be set at 10. If the count is less than the threshold, the process 400 may continue at block 415 so that another speed may be selected and more energy usages evaluated. If the count is equal to the threshold, the processing device 120 may reset the counter 125 and the process 400 may continue at block 435.

At block 435, the processing device 120 may select one of the energy usages evaluated as the target useable energy. The target useable energy may be, e.g., the highest remaining useable energy to deliver the most efficient total energy usage of the host vehicle 100 based on the speeds selected for evaluation at block 415. Therefore, the target useable energy may be associated with a first target speed of the host vehicle 100 at the first location, a second target speed at the second location, and a third target speed accelerating away from the second location.

At block 440, the processing device 120 may control the host vehicle 100 in accordance with the target useable energy. For instance, prior to reaching the first location, the processing device 120 may command the host vehicle 100 to slow to the first target speed, which as discussed above is based on the speed selected at block 415 that is associated with the highest or most efficient energy usage. As the host vehicle 100 travels from the first location to the second location, the processing device 120 may further command the host vehicle 100 to operate in accordance with the second target speed, which may include accelerating or decelerating the host vehicle 100 during the turn. The processing device 120 may further command the host vehicle 100 to accelerate away from the second location in accordance with the third target speed.

The process 400 may return to block 405 after the host vehicle 100 travels away from the second location. The process 400 may continue to execute until the host vehicle 100 is turned off or is no longer operating in an autonomous or partially autonomous mode.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
   a sensor configured to identify a first location and a second location; and
   a processing device programmed to estimate a plurality of energy usages each based at least in part on a different possible speed of a host vehicle at the first location, select one of the plurality of energy usages as a target useable energy, and, upon reaching the first location, control the host vehicle during a cornering maneuver, including braking, turning, and accelerating, in accordance with the speed associated with the selected target useable energy.

2. The vehicle system of claim 1, wherein the processing device is programmed to estimate a radius of a curve between the first and second locations.

3. The vehicle system of claim 1, wherein estimating the plurality of energy usages includes, for a plurality of different possible speeds of the host vehicle:
   estimating a first energy usage associated with the host vehicle reaching the first location, and
   estimating a second energy usage associated with the host vehicle reaching the second location; and
   wherein selecting one of the plurality of energy usages is based at least in part on the first energy usage and the second energy usage for each of the plurality of different possible speeds of the host vehicle.

4. The vehicle system of claim 3, wherein estimating the plurality of energy usages includes estimating a third energy usage associated with the host vehicle accelerating after reaching the second location, and wherein selecting one of the plurality of energy usages is based at least in part on the third energy usage.

5. The vehicle system of claim 1, wherein estimating the plurality of energy usages includes, for a plurality of different speeds, estimating a present regeneration loss associated with slowing the host vehicle prior to reaching the first location.

6. The vehicle system of claim 1, wherein estimating the plurality of energy usages includes, for a plurality of different speeds, estimating a future regeneration loss associated with accelerating the host vehicle after reaching the second location.

7. The vehicle system of claim 6, wherein the future regeneration loss includes energy losses associated with drawing energy from a power source.

8. The vehicle system of claim 1, wherein the host vehicle includes an electric vehicle or a hybrid vehicle.

9. A method comprising:
   identifying a first location and a second location along a route;
   estimating a plurality of energy usages, each based at least in part on a different possible speed of a host vehicle at the first location;
   selecting one of the plurality of energy usages as a target useable energy; and
   upon reaching the first location, controlling the host vehicle during a cornering maneuver, including braking, turning, and accelerating, in accordance with the speed associated with the selected target useable energy.

10. The method of claim 9, further comprising estimating a radius of a curve between the first and second locations.

11. The method of claim 9, wherein estimating the plurality of energy usages includes, for a plurality of different possible speeds of the host vehicle:
   estimating a first energy usage associated with the host vehicle reaching the first location, and
   estimating a second energy usage associated with the host vehicle reaching the second location; and
   wherein selecting one of the plurality of energy usages is based at least in part on the first energy usage and the second energy usage for each of the plurality of different possible speeds of the host vehicle.

12. The method of claim 11, wherein estimating the plurality of energy usages includes estimating a third energy usage associated with the host vehicle accelerating after reaching the second location, and wherein selecting one of the plurality of energy usages is based at least in part on the third energy usage.

13. The method of claim 9, wherein estimating the plurality of energy usages includes, for a plurality of different speeds, estimating a present regeneration loss associated with slowing the host vehicle prior to reaching the first location.

14. The method of claim 9, wherein estimating the plurality of energy usages includes, for a plurality of different speeds, estimating a future regeneration loss associated with accelerating the host vehicle after reaching the second location.

15. The method of claim 14, wherein the future regeneration loss includes energy losses associated with drawing energy from a power source.

16. The method of claim 9, wherein the host vehicle includes an electric vehicle or a hybrid vehicle.

17. A vehicle system comprising:
a sensor configured to identify a first location and a second location;
a power source configured to propel a host vehicle; and
a processing device programmed to estimate a radius of a curve between the first location and the second location, estimate a plurality of energy usages each based at least in part on a different possible speed of the host vehicle at the first location, select one of the plurality of energy usages as a target useable energy, and, upon reaching the first location, control the host vehicle during a cornering maneuver, including braking, turning, and accelerating, in accordance with the speed associated with the selected target useable energy.

18. The vehicle system of claim 17, wherein estimating the plurality of energy usages includes, for a plurality of different speeds of the host vehicle:
estimating a first energy usage associated with the host vehicle reaching the first location, and
estimating a second energy usage associated with the host vehicle reaching the second location; and
wherein selecting one of the plurality of energy usages is based at least in part on the first energy usage and the second energy usage for each of the plurality of different possible speeds of the host vehicle.

19. The vehicle system of claim 18, wherein estimating the plurality of energy usages includes estimating a third energy usage associated with the host vehicle accelerating after reaching the second location, and wherein selecting one of the plurality of energy usages is based at least in part on the third energy usage.

20. The vehicle system of claim 17, wherein estimating the plurality of energy usages includes, for a plurality of different speeds, estimating a present regeneration loss associated with slowing the host vehicle prior to reaching the first location and estimating a future regeneration loss associated with accelerating the host vehicle after reaching the second location.

* * * * *